US011209834B2

(12) United States Patent
Kalabic et al.

(10) Patent No.: US 11,209,834 B2
(45) Date of Patent: Dec. 28, 2021

(54) DIRECT AND INDIRECT CONTROL OF MIXED-AUTOMATA VEHICLE PLATOON

(71) Applicant: Mitsubishi Electric Research Laboratories, Inc., Cambridge, MA (US)

(72) Inventors: Uros Kalabic, Jamaica Plain, MA (US); Tianshu Chu, Palo Alto, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 160 days.

(21) Appl. No.: 16/655,633

(22) Filed: Oct. 17, 2019

(65) Prior Publication Data
US 2021/0116935 A1    Apr. 22, 2021

(51) Int. Cl.
*G05D 1/02* (2020.01)
*G05B 13/02* (2006.01)
*G05D 1/00* (2006.01)

(52) U.S. Cl.
CPC ......... *G05D 1/0291* (2013.01); *G05B 13/027* (2013.01); *G05D 1/0011* (2013.01); *G05D 1/0088* (2013.01); *G05D 2201/0213* (2013.01)

(58) Field of Classification Search
CPC .................................................. G05D 1/0291
See application file for complete search history.

(56) References Cited

U.S. PATENT DOCUMENTS

| | | | |
|---|---|---|---|
| 10,134,278 B1* | 11/2018 | Konrardy | G08G 1/096791 |
| 2008/0249667 A1* | 10/2008 | Horvitz | B60W 40/076 701/1 |
| 2010/0106603 A1* | 4/2010 | Dey | G01C 21/3617 705/14.63 |
| 2013/0204820 A1* | 8/2013 | Hunzinger | G06N 3/08 706/25 |
| 2020/0064146 A1* | 2/2020 | Kitajima | G01C 21/3407 |
| 2020/0106563 A1* | 4/2020 | Akoum | H04L 1/08 |
| 2020/0225321 A1* | 7/2020 | Kruglick | G01S 13/91 |
| 2020/0293009 A1* | 9/2020 | Quirynen | B60W 50/0097 |
| 2020/0304293 A1* | 9/2020 | Gama | G06F 17/147 |
| 2020/0342766 A1* | 10/2020 | Gundavelli | G05D 1/0295 |
| 2020/0379893 A1* | 12/2020 | Arechiga Gonzalez | G06F 17/13 |
| 2020/0409391 A1* | 12/2020 | Zhu | G05D 1/0088 |

(Continued)

*Primary Examiner* — Alex C Dunn
(74) *Attorney, Agent, or Firm* — Gennadiy Vinokur; Hironori Tsukamoto

(57) ABSTRACT

A system for direct and indirect control of mixed-autonomy vehicles receives a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group, submit the traffic state into a parameterized function trained to transform the traffic state into target headways for the mixed-autonomy vehicles to produce the target headways, and submit the target headways to a headway-based model configured to map the target headways to target speeds of the mixed-autonomy vehicles to produce the target speeds. The system determines and transmits control commands to the controlled vehicle based on one or combination of the target headways and the target speeds.

16 Claims, 9 Drawing Sheets

(56) References Cited

U.S. PATENT DOCUMENTS

2021/0056852 A1\* 2/2021 Lund ................... G08G 1/0112
2021/0107501 A1\* 4/2021 Monteil .................. A61B 5/01

\* cited by examiner

DIRECT AND INDIRECT CONTROL OF MIXED-AUTOMATA VEHICLE PLATOON

TECHNICAL FIELD

This invention relates generally to traffic control and more particularly to control a platoon of vehicles including controlled and uncontrolled vehicles.

BACKGROUND

Traffic congestion is a significant problem in many locales throughout the world, with costs that include lost hours, environmental threats, and wasted fuel consumption. The costs of traffic congestion can be measured in hundreds of dollars per capita per year in the United States. To that end, there is a need to reduce traffic congestion and/or improve any other traffic goal.

One possible contribution to solving these problems is to allow vehicles to be driven closer together in what are known as "vehicle platoons". The term "vehicle platoon" usually denote a number of vehicles with short distances between them, being driven as a single unit. The short distances lead to it being possible for more traffic to use the road, and the energy consumption for an individual vehicle being reduced since drag is reduced. Vehicles in a vehicle platoon are driven with at least one of an automated control of the speed of the vehicle and an automated control of its direction.

Many vehicles today are also equipped with a cruise-control system in order to make it easier for the driver to drive the vehicle. The desired speed can in this case be set by the driver by, for example, a regulator in the dashboard, and a cruise-control system in the vehicle subsequently influences a control system such that it accelerates and brakes the vehicle as appropriate, in order to maintain the desired speed. If the vehicle is equipped with an automatic gear-change system, the gear in which the vehicle is being driven is changed, such that the vehicle can maintain the desired speed.

For example, a connected adaptive cruise control (CACC) is a form of autonomous lane-keeping where vehicles communicate their positions to each other to a central system, in order to compute speed controls that ensure stability, robustness, and optimality. Vehicles with CACC can form platoons with other vehicles that are equipped with CACC. However, traffic may include vehicles with and without CACC. Even if all vehicles were equipped with CACC, some vehicle operators may choose not to engage CACC and drive manually. A significant problem in control of vehicle platoons is the inefficiencies that are caused when a manually-operated vehicle joins a platoon and disrupts the platoon. There is little that the platoon can do to remove the vehicle from the platoon due to difficulties in controlling and/or modeling manually-operated vehicles.

For example, one method breaks a platoon into several platoons to ensure homogeneity of the platoon control, see, e.g., U.S. Pat. No. 6,356,820. However, such a breaking duplicates control methods and increases distances between vehicles of different platoons, which can in turn increase traffic congestion. Another method controls the vehicles of the platoon to ensure the homogeneity of each platoon, see, e.g., U.S. 2012/0123658. However, these methods are difficult to impose on manually operated vehicles.

SUMMARY

It is an object of some embodiments to provide a system and a method for controlling a mixed vehicle platoon. As used herein, such a mixed vehicle platoon includes controlled and uncontrolled vehicles. Examples of controlled vehicles include autonomous and semiautonomous vehicles willing to form a platoon. For example, the controlled vehicle can use a connected adaptive cruise control (CACC) configured to determine a motion command to an actuator of the controlled vehicle to form and/or maintain the platoon. Examples of uncontrolled vehicles include autonomous and semiautonomous vehicles unwilling to form a platoon as well as manually-operated vehicles, i.e., vehicles operated by a human driver.

It is another object of some embodiments to provide an indirect control of the uncontrolled vehicles forming the platoon. Some embodiments are based on the recognition that movement of controlled vehicles forming a platoon can indirectly influence the movement of the uncontrolled vehicle in the platoon. For example, slowing down of a controlled vehicle forces the trailing uncontrolled vehicle to slow down as well. Similarly, increasing the speed of the controlled vehicle may encourage a driver of the trailing uncontrolled vehicle to speed up in the opening space. In such a manner, the direct control of the controlled vehicles can be used to encourage self-imposed control of the uncontrolled vehicle allowing to form a platoon from mixed vehicles including controlled and uncontrolled vehicles. Such an encouragement of the self-imposed control of the uncontrolled vehicle is referred herein as an indirect control.

On one hand, such an indirect control is unreliable. Indeed, an acceleration of the controlled vehicle may not force the acceleration of the uncontrolled vehicle. Quite to the contrarily, such an acceleration may undesirably force other drivers to sense danger and slow down their vehicles. However, some embodiments are based on the realization supported by experimental evidence that if at least two conditions provided below are satisfied, the direct control of the controlled vehicles can be efficiently used for indirect control in the mixed vehicle platoon.

The first of the two conditions relates to a means of enforcing the direct control. Some embodiments are based on the recognition that in order to efficiently control the mixed vehicle platoon, the means of the direct control of the controlled vehicles in the mixed vehicle platoon should be comparable with the means of self-imposed indirect control of the uncontrolled vehicle. Some embodiments are based on the recognition that means of self-imposed indirect control is the distance between the vehicles. Indeed, to maintain the safety, drivers maintain the distance they feel safe for the current speed of the traffic.

To that end, to unify direct and indirect controls, some embodiments provide direct control of the controlled vehicles by imposing a constraint on the motion for the control vehicle that includes one or combination of a maximum headway between two vehicles in the platoon and a maximum speed of each vehicle in the platoon. Such a direct control can be contrasted, for example, with a direct command to the actuators of the vehicles that would differ in principle from the self-imposed indirect control. In addition, the constraint on the headway and/or speed of the vehicle allow the controlled vehicles to use their legacy systems for motion control. For example, in some embodiments, the controlled vehicle is an autonomous vehicle configured to determine a motion command to an actuator of the autonomous vehicle subject to the constraint.

The second of the two conditions relates to calculation of the means of enforcing the direct control. Some embodiments are based on the realization that for efficient indirect control, the constraint on the headway and/or speed of the vehicles in the platoon needs to be determined using an optimization of a performance metric that is potentially common or at least relevant to all vehicles in the mixed vehicles platoon. In addition, such a performance metric should be determined under an assumption that all mixed vehicles are willing and able to participate in forming the platoon in a controlled manner.

However, such a direct and indirect controller for mixed-automata vehicles forming a platoon is challenging to design. There are two approaches in designing such controllers, i.e., learning-based controllers or learners, and solving-based controllers or solvers. Both learners and solvers map inputs into outputs. However, learners derive the mapping from data or experience, while solvers derive the mapping for each given input from a model. In this case, however, both approaches are suboptimal, because a behavior model of heteronomous mixed-automata vehicles is unknown, while the learners may fail to converge to a stable control due to sporadic behavior of the uncontrolled vehicles.

Some embodiments are based on the realization that reinforcement learning, such as deep reinforcement learning (DRL), can be modified according to principles of some embodiments derived for direct and indirect control of a platoon of mixed-automata vehicles. Specifically, instead of producing an action changing the environment, some embodiments train the parameterized function, such as a DRL controller, to produce target headways enforcing the platoon formation as a reward. In such a manner, learners can be adapted to unknown dynamics of mixed-automata vehicles.

For example, some embodiments use a headway-based model configured to map the target headways to target speeds of the mixed-autonomy vehicles and, e.g., ultimately to actions of the vehicles. The headway-based model allows to use the headways as control parameters and relates the control parameters to the actions of the vehicle that can be used to form the platoon. In other words, the headway-based model allows to learn the unknown behavior of heteronomous and, more generally, uncontrolled vehicles. An exemplar headway-based model of vehicle behavior is an optimal velocity model (OVM). The OVM relates a vehicle's headway to a safe velocity of travel. Other, similar models exist and can be used similarly by different embodiments.

Accordingly, one embodiment discloses a system for direct and indirect control of mixed-autonomy vehicles, including a receiver configured to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group; a memory configured to store a parameterized function trained to transform the traffic state into target headways for the mixed-autonomy vehicles; and store a headway-based model configured to map the target headways to target speeds of the mixed-autonomy vehicles; a processor configured to submit the traffic state into the parameterized function to produce the target headways; submit the target headways to the headway-based model to produce the target speeds; and determine control commands to the controlled vehicle based on one or combination of the target headways and the target speeds; and a transmitter configured to transmit the control commands to the controlled vehicles in the group of mixed-autonomy vehicles.

Another embodiment discloses a method for direct and indirect control of mixed-autonomy vehicles, wherein the method uses a processor coupled with stored instructions implementing the method, wherein the instructions, when executed by the processor carry out steps of the method, including receiving a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group; submitting the traffic state into a parameterized function trained to transform the traffic state into target headways for the mixed-autonomy vehicles to produce the target headways; submitting the target headways to a headway-based model configured to map the target headways to target speeds of the mixed-autonomy vehicles to produce the target speeds; determining control commands to the controlled vehicle based on one or combination of the target headways and the target speeds; and transmitting the control commands to the controlled vehicles in the group of mixed-autonomy vehicles.

Yet another embodiment discloses a non-transitory computer readable storage medium embodied thereon a program executable by a processor for performing a method. The method includes receiving a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group; submitting the traffic state into a parameterized function trained to transform the traffic state into target headways for the mixed-autonomy vehicles to produce the target headways; submitting the target headways to a headway-based model configured to map the target headways to target speeds of the mixed-autonomy vehicles to produce the target speeds; determining control commands to the controlled vehicle based on one or combination of the target headways and the target speeds; and transmitting the control commands to the controlled vehicles in the group of mixed-autonomy vehicles.

DETAILED DESCRIPTION

System Overview

The present disclosure relates to a mixed-autonomy group of vehicles, intended to form a platoon, which is a grouping of vehicles traveling together in a single lane. The autonomous characteristics of the group are mixed as some vehicles operate autonomously and willing to form a platoon, while some vehicles are not willing to form the platoon and/or operated by human operators. For example, one embodiment relates to a subgroup of autonomous vehicles that is controlled by a shared controller to achieve better operation of the platoon as a whole.

Figure 1A:
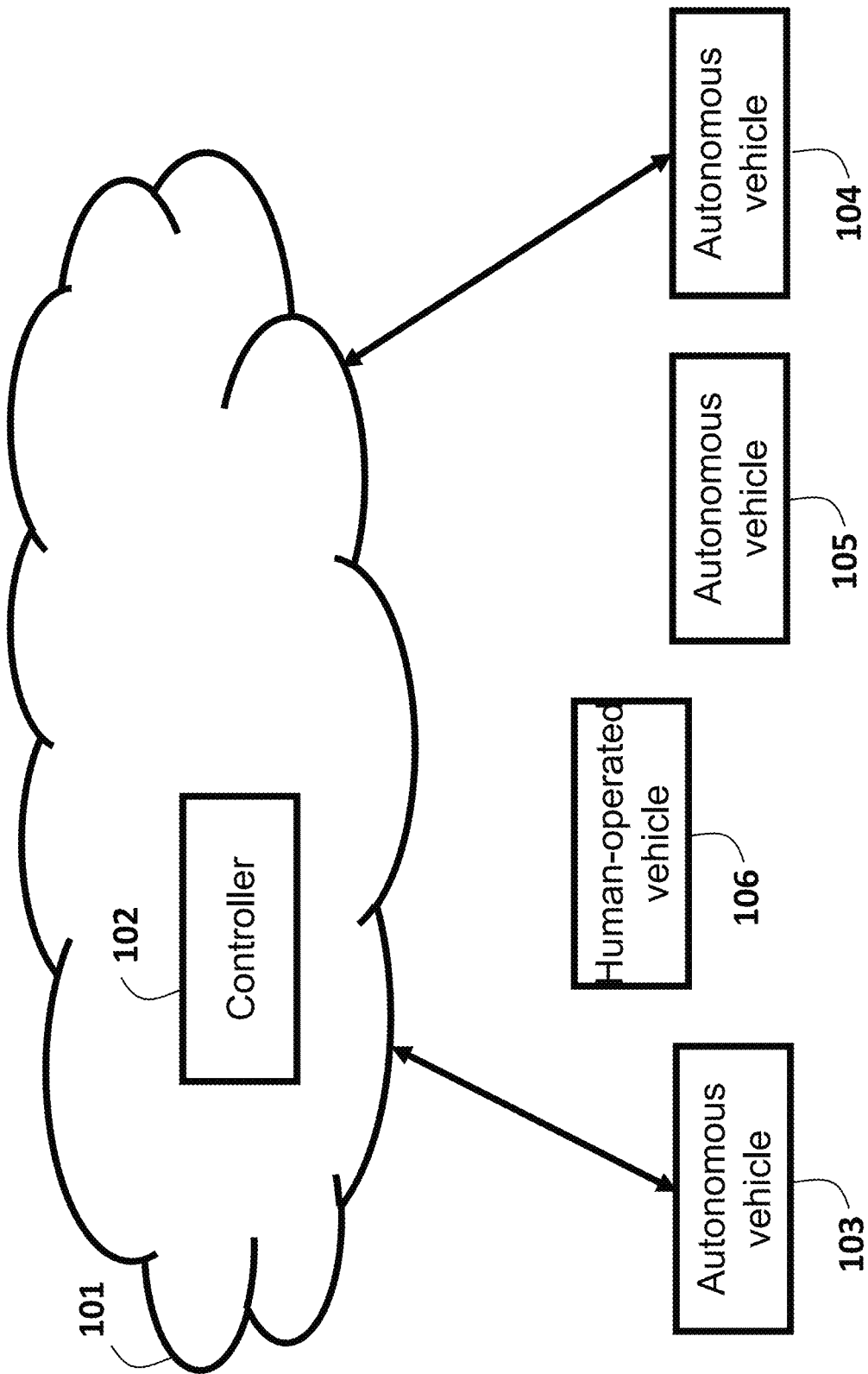
FIG. 1A shows a schematic of control of mixed-autonomy vehicles forming a platoon according to some embodiments.

FIG. 1A shows a schematic of control of mixed-autonomy vehicles forming a platoon according to some embodiments. According to some embodiments, a group of mixed-autonomy vehicles includes controlled vehicles willing to participate in a platoon formation and at least one uncontrolled vehicle. The controller 102 directly controls controlled autonomous vehicles, e.g., vehicles 103 and 104, by transmitting control commands to the control vehicles. The controller 102 also indirectly controls the uncontrolled vehicles, such as autonomous vehicle 105 unwilling to participate in the platoon and a human-operated vehicle 106. Specifically, the controller 102 controls the controlled vehicles based on the traffic state of the mixed-autonomy vehicles such that the direct control of the controlled vehicles also provide the indirect control of the uncontrolled vehicles.

To control vehicles of differing types of autonomy, some embodiments use a control parameter shared among all vehicles and directly control the controlled vehicles based on this parameter, while tracking this parameter for other vehicles. To this end, it is a realization of some embodiments, that vehicles, whether autonomous or human-operated, ultimately control their behavior on long stretches of road, in a single lane, according to a desired velocity and headway, i.e. the distance to the vehicle ahead. More specifically, a platoon of vehicles shares a desired velocity amongst all vehicles whereas the headway can vary based on the type of vehicle, on-board controller and autonomy characteristics.

For example, some embodiments are based on realization supported by experimental evidence that if at least two conditions provided below are satisfied, the direct control of the controlled vehicles can be efficiently used for indirect control in the mixed vehicle platoon. The first of the two conditions relates to means of enforcing the direct control. Some embodiments are based on recognition that in order to efficiently control the mixed vehicle platoon, the means of the direct control of the controlled vehicles in the mixed vehicle platoon should be comparable with the means of self-imposed indirect control of the uncontrolled vehicle. Some embodiments are based on recognition that means of self-imposed indirect control is distance between the vehicles. Indeed, to maintain the safety, drivers maintain the distance they feel safe for the current speed of the traffic.

The second of the two conditions relates to calculation of the means of enforcing the direct control. Some embodiments are based on realization that for efficient indirect control, the target headways of the vehicles in the platoon needs to be determined using an optimization of a performance metric that is potentially common or at least relevant to all vehicles in the mixed vehicles platoon. In addition, such a performance metric should be determined under an assumption that all mixed vehicles are willing and able to participate in forming the platoon in a controlled manner.

However, such a direct and indirect controller for mixed-automata vehicles forming a platoon is challenging to design. There are two approaches in designing such controllers, i.e., learning based controllers or learners, and solving based controllers or solvers. Both learners and solvers map inputs into outputs. However, learners derive the mapping from data or experience, while solvers derive the mapping for each given input from a model. In this case, however, both approaches are suboptimal, because a behavior model of heteronomous mixed-automata vehicles is unknown, while the learners may fail to converge to a stable control due to sporadic behavior of the uncontrolled vehicles.

For example, learning based control can be derived from two classes of learners: deep learners and deep reinforcement learners. In both deep learning (DL) and deep reinforcement learning (DRL), training results in a parameterized function that has a fixed structure, given by a deep neural network, and a number of adjustable parameters. The difference between DL and DRL is in the way in which the functions are learned during training. Deep learning is a supervised method where the parameters are learned by minimizing an error function that depends on the inputs and target outputs in a training set. Deep reinforcement learning, on the other hand, is a non-supervised method that learns from experience, where the error function depends on the value of states and their successors. In both DL and DRL, the training can be performed by minimizing the error function via stochastic gradient descent where the parameter vector is modified incrementally by taking steps in the direction of the gradient. Similar optimization algorithms are used in policy-based DRL where the parameterized function represents a policy.

Some embodiments are based on realization that reinforcement learning, such as DRL, can be modified according to principles of some embodiments derived for direct and indirect control of a platoon of mixed-automata vehicles. Specifically, instead of producing action changing the environment, some embodiments train the parameterized function, such as DRL controller, to produce target headways enforcing the platoon formation as a reward. In such a manner, learners can be adapted to unknown dynamics of mixed-automata vehicles.

For example, some embodiments use a headway-based model configured to map the target headways to target speeds of the mixed-autonomy vehicles and, e.g., ultimately to actions of the vehicles. The headway-based model allows to use the headways as control parameters and relates the control parameters to the actions of the vehicle that can be used to form the platoon. In other words, the headway-based model allows to learn the unknown behavior of heteronomous and, more generally, uncontrolled vehicles. An exemplar headway-based model of vehicle behavior is an optimal velocity model (OVM). The OVM relates a vehicle's headway to a safe velocity of travel. Other, similar models exist and can be used similarly by different embodiments. For example, some embodiments use a variation of the OVM with different optimal velocity functions (OVFs), the full-velocity difference model (FVDM), the intelligent driver model (IDM), variations thereof, etc.

For example, in one embodiment, a particular learning-based control scheme that is used is an augmented deep reinforcement learning (DRL). DRL solves an on-line optimization to simultaneously learn the behavior of a system and learn to control the same system. In general, DRL can be model-free or augmented with the use of a model. Without a model, the behavior of the DRL controller can become erratic as the optimization may encounter convergence difficulties due to the presence of more local optima due to the need to optimize over a larger set of parameters. In fact, our own experimentation comparing model-free DRL and the augmented DRL has shown that, while model-free DRL is often not able to converge to a stable control, the model-based version has little difficulty in doing so.

Figure 1B:
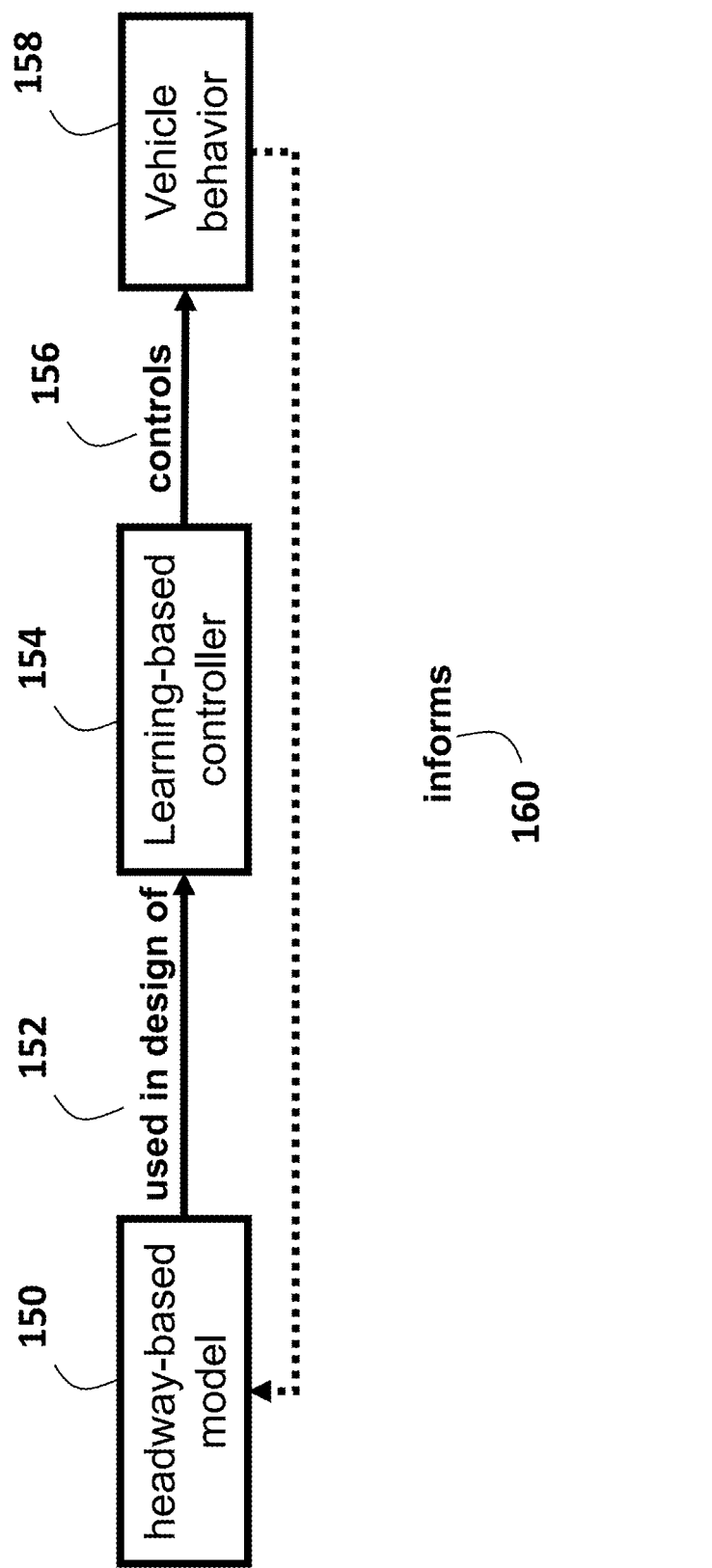
FIG. 1B shows a general workflow of learning-based controllers augmented with a headway-based model according to some embodiments.

FIG. 1B shows a general workflow of learning-based controllers augmented with a headway-based model according to some embodiments. A headway-based model 150 is used to represent behavior of the vehicles as an integral part in the design of a learning-based controller 154 trained to control 156 the behavior of vehicles 158 in the platoon. The model 150 is informed 160 as a design choice by actual vehicles behavior 158, such that the connected vehicles are controlled directly and the unconnected vehicles are controlled indirectly.

In general, the headway of a vehicle i in a platoon evolves according to the differential equation:

$$\dot{h}_i = v_{i-1} - v_i$$

where $h_i$ is the vehicle's headway, $v_i$ is its speed, and $v_{i-1}$ is the speed of the vehicle leading it. The speed evolves according to:

$$\dot{v}_i = u_i$$

where $u_i$ is the vehicle acceleration. The acceleration is proportional to the force on the vehicle, which is transferred to the vehicle body through the contact of the wheels with the ground. The force itself is determined as the output of some high-level controller, which could be a human operator in the case of heteronomous vehicles, or a speed controller in the case of autonomous vehicles. For the purpose of modeling, some embodiments represent the acceleration is the weighted sum of two parameters, the weightings of which differ from vehicle to vehicle, $$u_i = \alpha_i(v_i^o - v_i) + \beta_i(v_{i-1} - v_i)$$

The first parameter $(v_i^o - v_i)$ is the difference between the actual speed and the desired speed. The second parameter $(v_{i-1} - v_i)$ is the rate of change of the headway. The desired speed is modeled using the OVF, whose input is the headway:

$$v_i^O = v^O(h_i) = \begin{cases} 0 & \text{if } h_i \leq h^s \\ 0.5 v_{max}\left(1 - \cos\left(\pi \frac{h_i - h^s}{h^g - h^s}\right)\right) & \text{if } h^s < h_i < h^g \\ v_{max} & \text{if } h \geq h^g \end{cases}$$

The parameters $v_{max}$, $h^s$, and $h^g$ differ between individual vehicles. The symbols refer to maximum preferred velocity $v_{max}$, i.e. the speed at which a vehicle would travel in the absence of obstacles, stopping headway $h^s$, i.e. the headway at which the vehicle would come to a full stop, and go-ahead, or full-speed, headway $h^g$, i.e. the headway at which the vehicle would travel at maximum velocity $v_{max}$.

The control system includes a communication system that monitors the headways h, speeds v, and accelerations u of non-controlled vehicles. In some embodiments, the controller can include a communication system in which non-controlled vehicles communicate these parameters to the central system; in other embodiments, controlled vehicles measure these parameters and communicate them to the central system. In general, there exists a range in which all vehicles should report their parameters or have their parameters measured. For this reason, in some embodiments the mixed-automata vehicles include all uncontrolled vehicles within a predetermined range from flanking controlled vehicles in the platoon. For example, in one embodiment the range D in which all vehicles' parameters is at least about twice the full-speed headway $h^g$ of an average controlled vehicles traveling with the maximum allowed speed, i.e., $D \geq 2h^g$.

Figure 2:
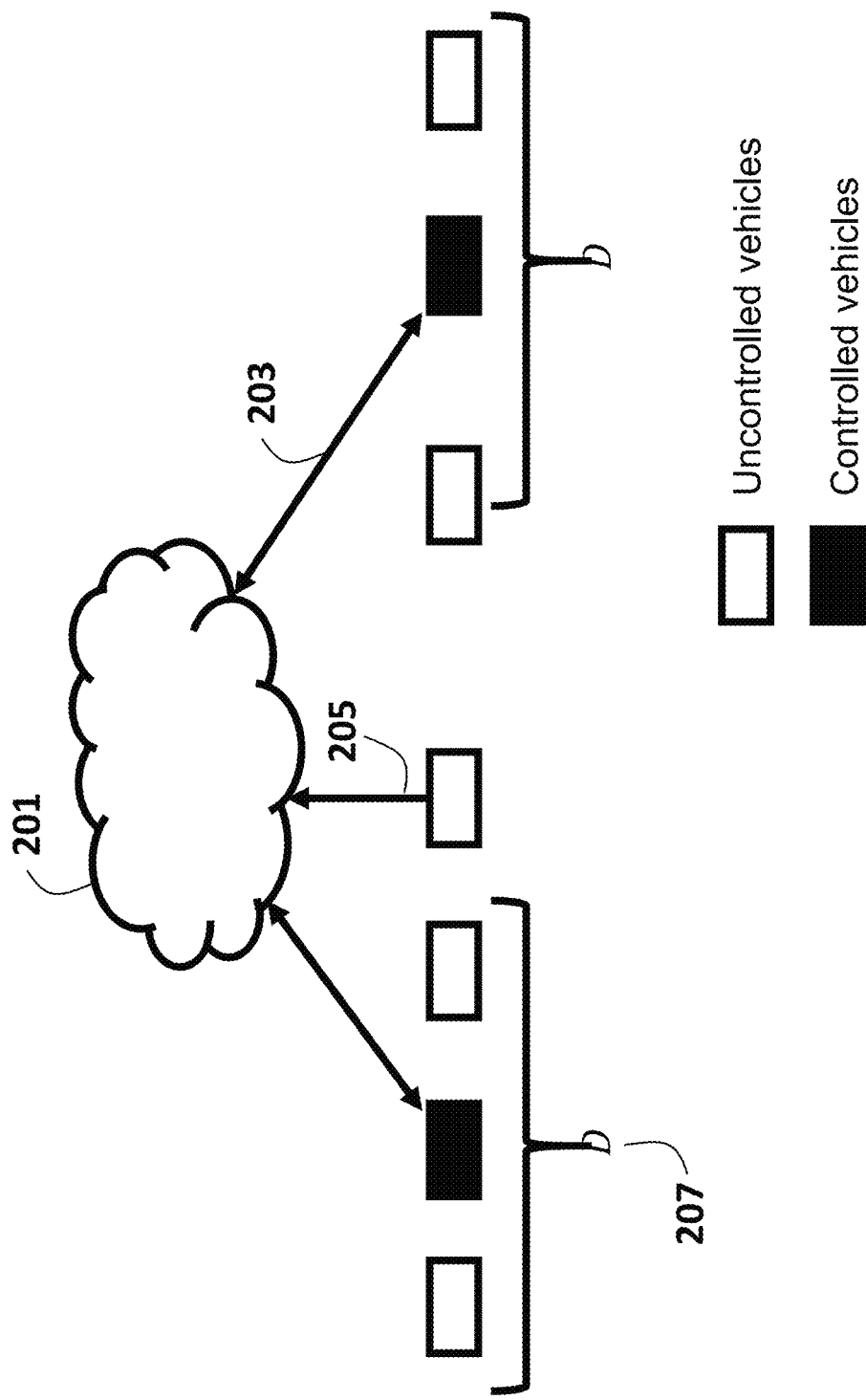
FIG. 2 shows a schematic providing general overview of direct and indirect control of a platoon formation according to some embodiments.

FIG. 2 shows a schematic providing general overview of direct and indirect control of a platoon formation according to some embodiments. Controlled vehicles are connected to the controller and communicate their states 203 to the central controller 201. The traffic state collected by the controller 201 may include current headways, current speeds, and current acceleration of the mixed-automata vehicles. In some implementations, the mixed-automata vehicles include all uncontrolled vehicles within a predetermined range 207 from flanking controlled vehicles in the platoon. In addition to the controlled vehicles, some uncontrolled vehicles are also connected 205 to the controller 201 to submit their states.

The control of vehicles in a platoon is generally called cooperative adaptive cruise control (CACC). The CACC can be designed for a group of vehicles, all of which are controlled. Since ordinary control methods do not consider cases where some vehicles in a platoon could be uncooperative, some embodiments develop new methods but still aim to achieve the performance of ordinary platoon formation of autonomous vehicles. There are two aims of CACC: plant-stability and string-stability. A platoon is plant-stable if all vehicles approach the same, constant velocity; a platoon is string-stable if disturbances in velocity are attenuated for the entire platoon.

Some embodiments extend the principles of the CACC designed for the controlled vehicles to the mixed-automata vehicles. These two aims of CACC inform the augmented learning-based controller of some embodiments. Specifically, the learning-based method uses a cost function designed based on these two aims. In some embodiments, the cost function includes a sum of two components:

$$c_i = c_{i,s} + a_p c_{i,p}$$

where $c_i$ is the cost incurred by each individual, observed vehicle and $c_{i,s}$ is the component of the cost function related to string stability and $c_{i,p}$ is the component of the cost function related to plant stability; $a_p$ is a design parameter that weights string to plant stability. The components themselves are given by:

$$c_{i,s} = (h_i - h^*)^2 + a_v(v_i - v^*)^2$$

and $$c_{i,p} = u_i^2$$

where $h^*$ and $v^*$ are a desired headway and velocity for the platoon and $a_v$ is a design parameter that weights headway to velocity tracking.

In some embodiments, the cost function is further modified since stability is not the only consideration in control of a platoon. In particular, an important consideration is that vehicles do not collide with each other. For this reason, in some embodiments, we modify the cost function to include a penalty term on the cost:

$$\bar{c}_i = c_i - a_c \max(h_i - h^s, 0)^2$$

The penalty term penalizes headways that are close to the stopping headway since below this headway, risk of collision becomes high; $a_c$ is a design parameter that weights constraint satisfaction to platoon control.

Generally, reinforcement learning algorithms attempt to maximize some value function. Here, the value function V is the negative of the sum of the cost function over all observed vehicles and a planning horizon of time T:

$$V = -\Sigma_{t=1}^{T} \Sigma_{i \in A} \bar{c}_i$$

where A is the set of observed vehicles.

Ordinarily, the output of a control algorithm is the control itself, in this case the acceleration $u_i$. However, as shown in experiment, in a complex system that includes heteronomous vehicles, it is difficult to directly learn the appropriate acceleration. For this reason, some embodiments instead set the control output according to:

$$u_i = \bar{a}(v_i^o(h_i, h_i^g, h_i^s) - v_i) + \bar{b}(v_{i-1} - v_i)$$

The parameters $\bar{a}$ and $\bar{b}$ are design parameters that weight tracking of optimal velocity to tracking of the lead vehicle velocity.

In some embodiments, the target headways determined by the controller is the go-ahead headway $h_i^g$. As described above, the optimal velocity relates a headway $h_i$, stopping headway $h_i^s$ and go-ahead headway $h_i^g$ to a velocity $v_i^o$. In the preferred embodiment the stopping headway $h_i^s$ is fixed across all controlled vehicles. This is done for safety reasons since it is otherwise possible to set the stopping headway to a small, unsafe value or large value that would have unforeseen effects on traffic; the latter is chiefly done to protect the control of the platoon in training.

Figure 3A:
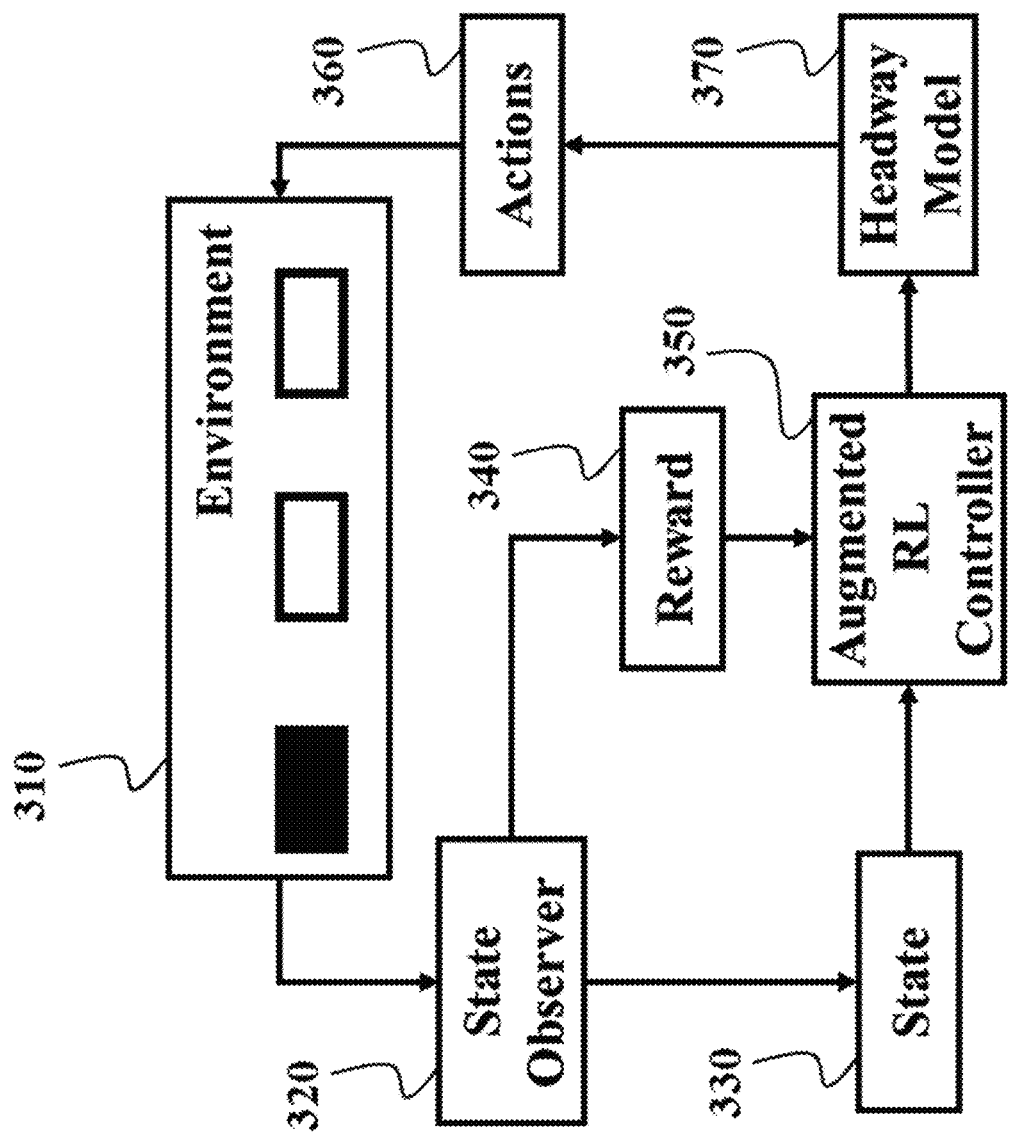
FIG. 3A shows a schematic of training an augmented reinforcement learning controller according to some embodiments.

FIG. 3A shows a schematic of training an augmented reinforcement learning controller according to some embodiments. In an augmented reinforcement learning (RL), such as the augmented DRL, the augmented RL controller 350 interacts with its environment 310 in discrete time steps. At each time t, the RL controller receives an observation 320 of a traffic state 330 in the environment 310 and the reward 340. Ultimately, the augmented RL controller 350 is used to select an action 360 from the set of available actions, which is subsequently sent to the environment as a control command to change the traffic state in the environment. The actions are selected to collect as much reward as possible and the reward is determined to encourage the platoon formation.

However, in contrast with model-free RL, the augmented RL controller is not trained to output the actions, but trained to output the target headways according to the principles of the direct and indirect control of mixed-automata vehicles forming the platoon. Hence, the target headways produced by the augmented RL are further submitted to the headway-based model 370 to produce the control commands specifying actions for the control machine. To further encourage mixed-automata platoon formation, the state 330 is determined for all mixed-automata vehicles, as well as the reward 340. In such a manner, the augmented RL controller is trained to transform the traffic state of the group of mixed-autonomy vehicles into the target headways that improve actions of the mixed-autonomy vehicles in the group, while the actions are defined by the target headways according to the headway-based model. In effect, the augmented RL controller allows to control the mixed-autonomy vehicles in platoon formation.

Different embodiments use different methods to train the parameterized function forming the RL controller. For example, in some embodiments, the parameterized function is trained using one of a deep deterministic policy gradient method, advantage-actor critic method, proximal policy optimization method, deep Q-network method, or Monte Carlo policy gradient method.

Figure 3B:
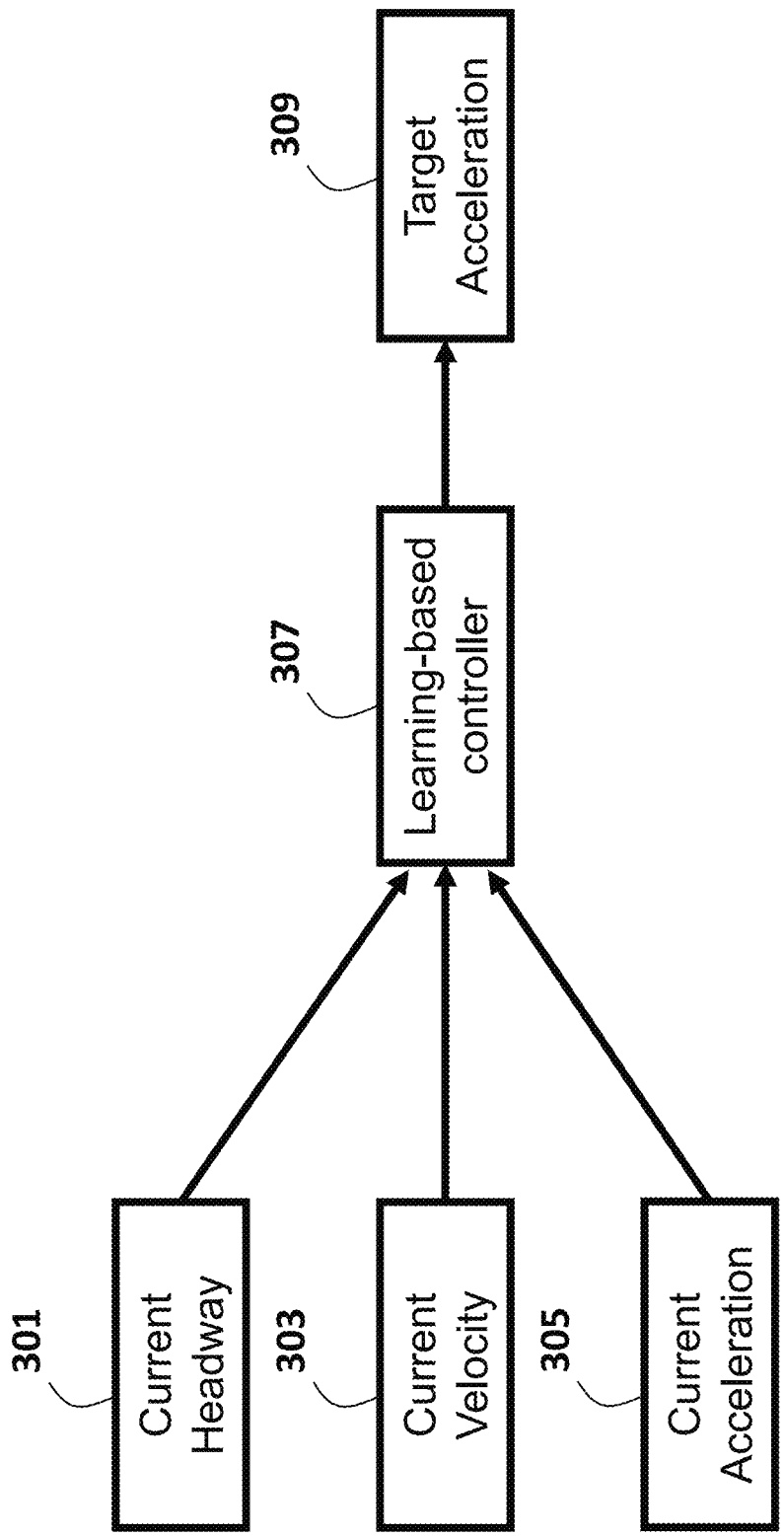
FIG. 3B shows the inputs and outputs to the learning of FIG. 3A according to one embodiment.

FIG. 3B shows the inputs and outputs to the learning of FIG. 3A according to one embodiment. The inputs to the learning algorithm 307, through the reward function, include current headways $h_i$ 301, current velocities $v_i$ 303, and current accelerations $u_i$ 305 of all observed vehicles, i.e. all vehicles for which these parameters are communicated to the controller. The outputs are the target accelerations 309 to the connected, autonomous vehicles.

In some embodiments, inputs are directly measured and reported. In general, the measurements should be passed through an estimation algorithm to filter out noise in the signals. In other embodiments, a model-based approach using a model like the optimal velocity model can be used to determine the acceleration with knowledge of the headways and velocities.

In one embodiment, the control algorithm used is based on deep reinforcement learning. The deep, as opposed to ordinary, reinforcement learning uses a deep neural network to determine the controls $h_i^g$ that minimizes the value function V.

Figure 4:
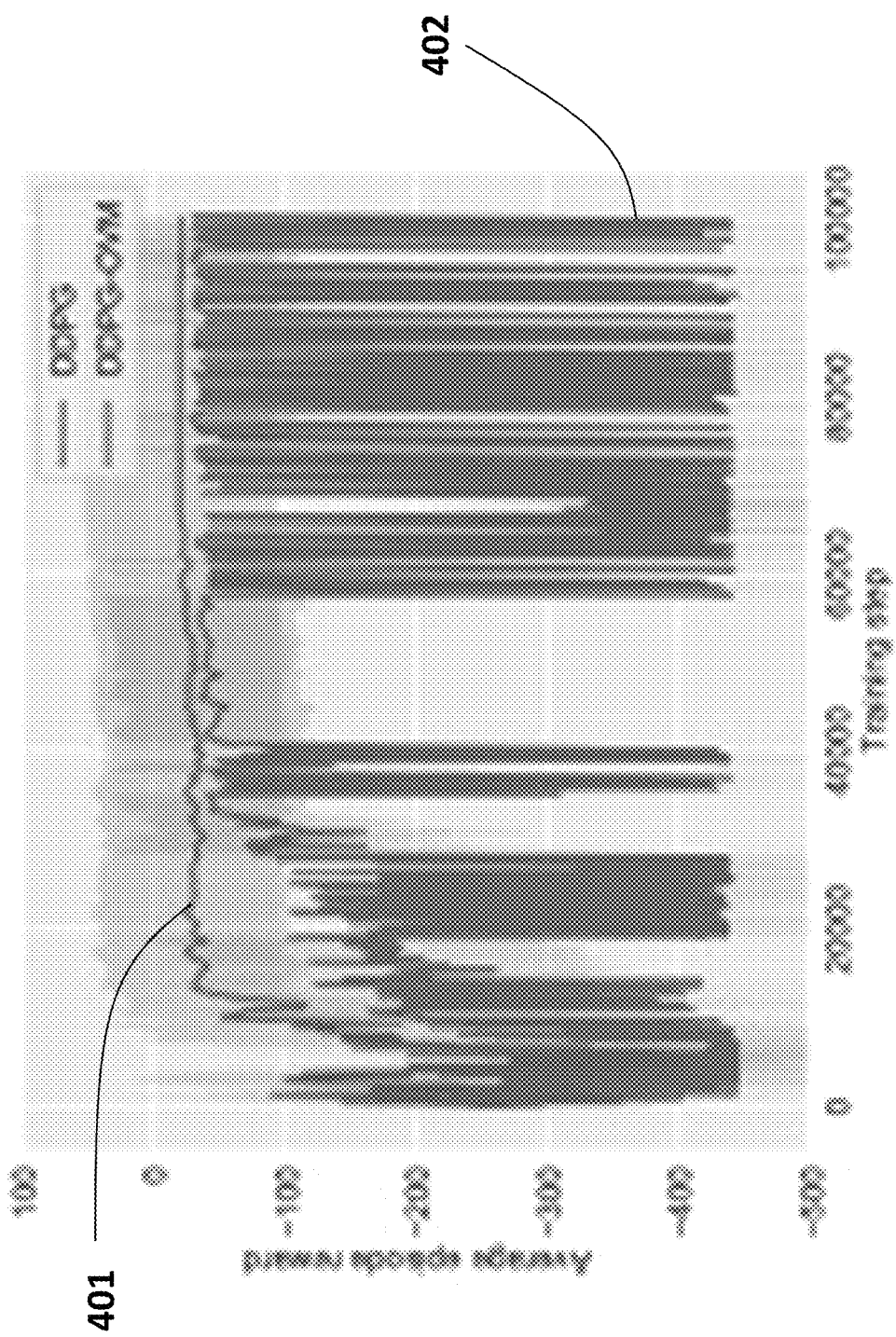
FIG. 4 shows a plot comparing convergence of model-free and augmented reinforcement learning according to some embodiments.

FIG. 4 shows a plot comparing convergence of model-free and augmented reinforcement learning according to some embodiments. FIG. 4 shows the results of experimentation demonstrating that a simple deep neural network without extensive tuning has satisfactory performance strongly suggesting that the augmented reinforcement learning is very appropriate for this application. The learning of the augmented optimal control converges quickly 401, whereas a model-free method using the same learning method does not converge 402.

In application of controllers to systems, the controller is implemented digitally using an embedded computer. For this reason, implementation of controller is typically done using a discrete-in-time implementation. The procedure to convert a continuous-in-time design to discrete-in-time is standard and various procedures exist that can do this. In particular, we have done this in experimentation using a zero-order hold method.

More importantly, the action space, i.e. the set in which the action $h_i^g$ resides, is continuous because $h_i^g$ is granular, i.e. possible choices of $h_i^g$ are theoretically not countable. For this reason, we find it necessary to implement a deep reinforcement learning algorithm that is appropriate for use with continuous-action spaces. Such a method is the deep deterministic policy gradient method. This is the method used in one of the embodiments but in no way are the methods and systems presented above limited to the use of one type of reinforcement learning algorithm. Other methods that we have implemented, with similar success in experimentation as the other embodiment, uses the advantage-actor critic method.

Exemplar Embodiments

Figure 5:
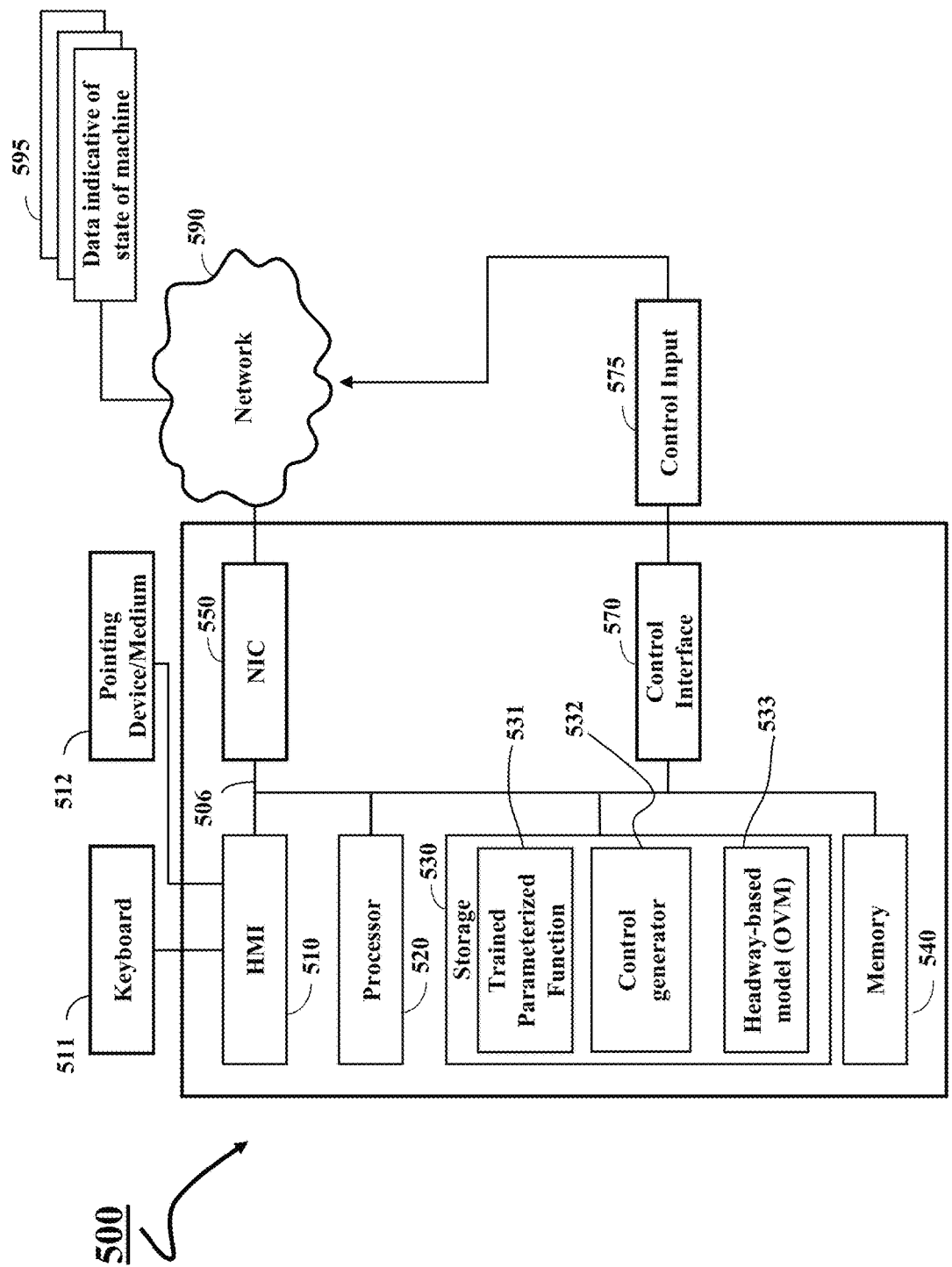
FIG. 5 shows a block diagram of a system for direct and indirect control of mixed-autonomy vehicles in accordance with some embodiments.

FIG. 5 shows a block diagram of a system 500 for direct and indirect control of mixed-autonomy vehicles in accordance with some embodiments. The system 500 can have a number of interfaces connecting the system 500 with other machines and devices. A network interface controller (NIC) 550 includes a receiver adapted to connect the system 500 through the bus 506 to a network 590 connecting the system 500 with the mixed-automata vehicles to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group and the controlled vehicle. For example, in one embodiment the traffic state includes current headways, current speeds, and current acceleration of the mixed-automata vehicles. In some embodiments, the mixed-automata vehicles include all uncontrolled vehicles within a predetermined range from flanking controlled vehicles in the platoon.

The NIC 550 also includes a transmitter adapted to transmit the control commands to the controlled vehicles via the network 590. To that end, the system 500 includes an output interface, e.g., a control interface 570, configured to submit the control commands 575 to the controlled vehicles in the group of mixed-autonomy vehicles through the network 590. In such a manner, the system 500 can be arranged on a remote server in direct or indirect wireless communication with the mixed-automata vehicles.

The system 500 can also include other types of input and output interfaces. For example, the system 500 can include a human machine interface 510. The human machine interface 510 can connect the controller 500 to a keyboard 511 and pointing device 512, wherein the pointing device 512 can include a mouse, trackball, touchpad, joy stick, pointing stick, stylus, or touchscreen, among others.

The system 500 includes a processor 520 configured to execute stored instructions, as well as a memory 540 that stores instructions that are executable by the processor. The processor 520 can be a single core processor, a multi-core processor, a computing cluster, or any number of other configurations. The memory 540 can include random access memory (RAM), read only memory (ROM), flash memory, or any other suitable memory machines. The processor 520 can be connected through the bus 506 to one or more input and output devices.

The processor 520 is operatively connected to a memory storage 530 storing the instruction as well as processing data used by the instructions. The storage 530 can form a part of or be operatively connected to the memory 540. For example, the memory can be configured to store a parameterized function 531 trained to transform the traffic state into target headways for the mixed-autonomy vehicles; and store a headway-based model 533 configured to map the target headways to target speeds of the mixed-autonomy vehicles.

The processor 520 is configured to determine control commands for the controlled vehicles that indirectly control the uncontrolled vehicles as well. To that end, the processor is configured to execute a control generator 532 to submit the traffic state into the parameterized function to produce the target headways, submit the target headways to the headway-based model to produce the target speeds, and determine control commands to the controlled vehicle based on one or combination of the target headways and the target speeds.

In some embodiments, the parameterized function 531 is a deep reinforcement learning (DRL) controller trained to transform the traffic state of the group of mixed-autonomy vehicles into the target headways than improve actions of the mixed-autonomy vehicles in the group, wherein the actions are defined by the target headways according to the headway-based model. For example, the target headways are determined such that the actions improve a value function of a cost of the movement of the platoon formation, as described above. Examples of the value function include a negative of a sum of the cost of the movement of the mixed-automata vehicles over a planning horizon of time.

In some embodiments, the cost is a cost function of multiple terms encouraging the platoon formation. For example, in some embodiments, the cost of the movement includes a component related to string stability of the platoon, a component related to a plant stability of the platoon, and a penalty term to penalize proximity of the target headways to stopping headways.

In various embodiments, the DRL controller is a model-based DRL augmented with the headway-based model to solve an on-line optimization to simultaneously learn a behavior of a traffic system having the traffic state and learn to control of the traffic system to form the platoon, such that the behavior of the traffic system is defined by the target headways produced by the DRL controller and the control of the traffic system is defined by accelerations of mixed-automata vehicles determined from the target headways according to the headway-based model.

In some embodiments, the headway-based model is an optimal velocity model (OVM) the maps the target headway to speed of the vehicles, such that the DRL controller is an OVM-augmented DRL. The OVM maps the target headways to speed of the vehicles. In some embodiments, the system 500 is configured to determine target speeds of the controlled vehicles from the target headways according to the OVM and to form the control commands to the controlled vehicle to include the corresponding target speeds of the controlled vehicle.

For example, the headway-based model, such as OVM, relates current headways, stopping headways and go-ahead headways of the mixed-automata vehicles to target speed of the mixed-automata vehicles. The target headways determined by the parameterized function are the go-ahead headways and the system 500 determines the target speeds of the controlled commands for the mixed-automata vehicles according to the headway-based model with the determined go-ahead headways and predetermined fixed stopping headways.

Figure 6A:
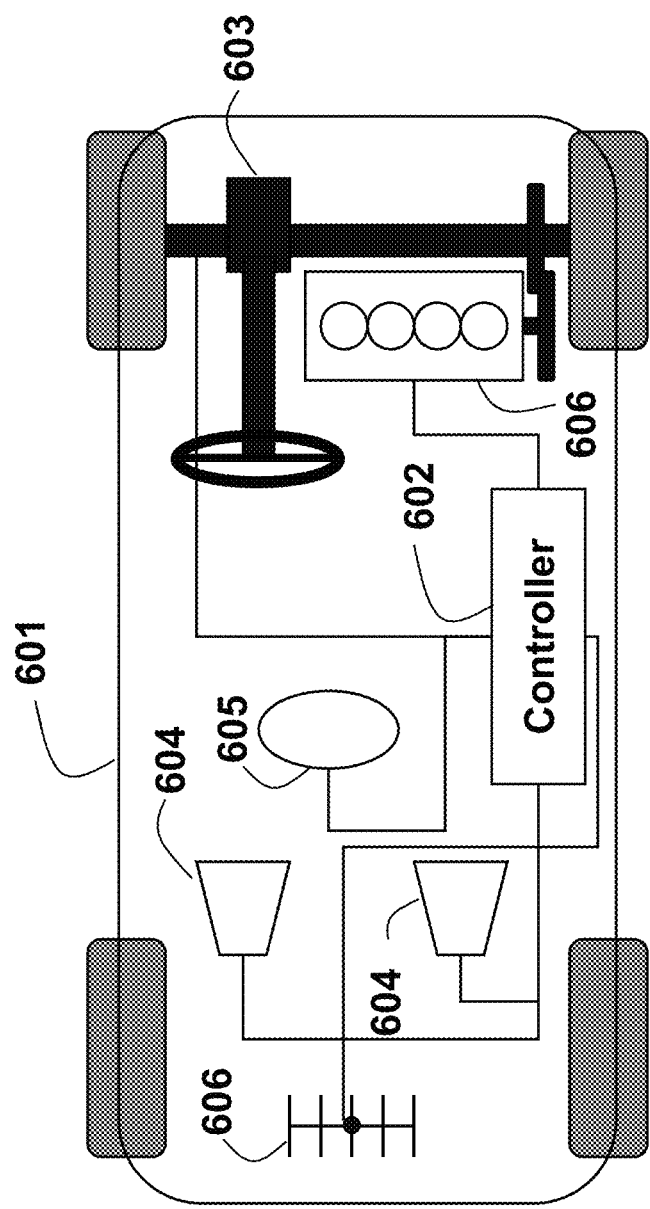
FIG. 6A shows a schematic of a vehicle controlled directly or indirectly according to some embodiments.

FIG. 6A shows a schematic of a vehicle 601 controlled directly or indirectly according to some embodiments. As used herein, the vehicle 601 can be any type of wheeled vehicle, such as a passenger car, bus, or rover. Also, the vehicle 601 can be an autonomous or semi-autonomous vehicle. For example, some embodiments control the motion of the vehicle 601. Examples of the motion include lateral motion of the vehicle controlled by a steering system 603 of the vehicle 601. In one embodiment, the steering system 603 is controlled by the controller 602 in communication with the system 500. Additionally, or alternatively, the steering system 603 can be controlled by a driver of the vehicle 601.

The vehicle can also include an engine 606, which can be controlled by the controller 602 or by other components of the vehicle 601. The vehicle can also include one or more sensors 604 to sense the surrounding environment. Examples of the sensors 604 include distance range finders, radars, lidars, and cameras. The vehicle 601 can also include one or more sensors 605 to sense its current motion quantities and internal status. Examples of the sensors 605 include global positioning system (GPS), accelerometers, inertial measurement units, gyroscopes, shaft rotational sensors, torque sensors, deflection sensors, pressure sensor, and flow sensors. The sensors provide information to the controller 602. The vehicle can be equipped with a transceiver 606 enabling communication capabilities of the controller 602 through wired or wireless communication channels.

Figure 6B:
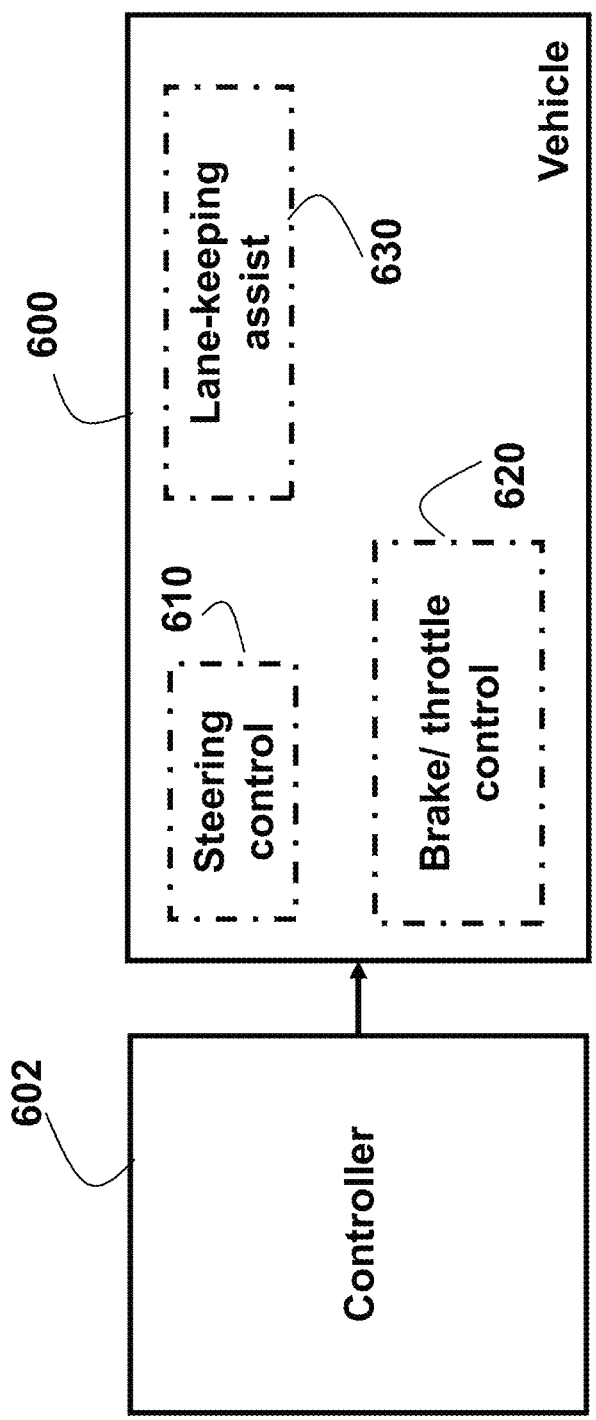
FIG. 6B shows a schematic of interaction between the controller receiving controlled commands determined according to some embodiments and other controllers of the vehicle.

FIG. 6B shows a schematic of interaction between the controller 602 receiving controlled commands from the system 500 and the controllers 600 of the vehicle 601 according to some embodiments. For example, in some embodiments, the controllers 600 of the vehicle 601 are steering 610 and brake/throttle controllers 620 that control rotation and acceleration of the vehicle 600. In such a case, the controller 602 outputs control inputs to the controllers 610 and 620 to control the state of the vehicle. The controllers 600 can also include high-level controllers, e.g., a lane-keeping assist controller 630 that further process the control inputs of the predictive controller 602. In both cases, the controllers 600 maps use the outputs of the predictive controller 602 to control at least one actuator of the vehicle, such as the steering wheel and/or the brakes of the vehicle, in order to control the motion of the vehicle. States $x_t$ of the vehicular machine could include position, orientation, and longitudinal/lateral velocities; control inputs $u_t$ could include lateral/longitudinal acceleration, steering angles, and engine/brake torques. State constraints on this system can include lane keeping constraints and obstacle avoidance constraints. Control input constraints may include steering angle constraints and acceleration constraints. Collected data could include position, orientation, and velocity profiles, accelerations, torques, and/or steering angles.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for direct and indirect control of mixed-autonomy vehicles, comprising:
   a receiver configured to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group;
   a memory configured to
      store a parameterized function trained to transform the traffic state into target headways for the mixed-autonomy vehicles; and
      store a headway-based model configured to map the target headways to target speeds of the mixed-autonomy vehicles;
   a processor configured to
      submit the traffic state into the parameterized function to produce the target headways;
      submit the target headways to the headway-based model to produce the target speeds; and
      determine control commands to the controlled vehicle based on one or combination of the target headways and the target speeds, wherein the headway-based model is an optimal velocity model (OVM) that maps the target headways to target speed of the vehicles, wherein the processor is configured to determine the target speeds of the controlled vehicles from the target headways according to the OVM and to form the control commands to the controlled vehicle to include the corresponding target speeds of the controlled vehicle; and
   a transmitter configured to transmit the control commands to the controlled vehicles in the group of mixed-autonomy vehicles.

2. The system of claim 1, wherein the parameterized function is a deep reinforcement learning (DRL) controller trained to transform the traffic state of the group of mixed-autonomy vehicles into the target headways than improve actions of the mixed-autonomy vehicles in the group, wherein the actions are defined by the target headways according to the headway-based model.

3. The system of claim 2, wherein the target headways are determined such that the actions improve a value function of a cost of the movement of the platoon formation.

4. The system of claim 3, wherein the value function is a negative of a sum of the cost of the movement of the mixed-automata vehicles over a planning horizon of time.

5. The system of claim 4, wherein the cost of the movement includes a component related to string stability of the platoon, a component related to a plant stability of the platoon, and a penalty term to penalize proximity of the target headways to stopping headways.

6. The system of claim 2, wherein the DRL controller is a model-based DRL augmented with the headway-based model to solve an on-line optimization to simultaneously learn a behavior of a traffic system having the traffic state and learn to control of the traffic system to form the platoon, such that the behavior of the traffic system is defined by the target headways produced by the DRL controller and the control of the traffic system is defined by accelerations of mixed-automata vehicles determined from the target headways according to the headway-based model.

7. The system of claim 2, wherein the headway-based model is an optimal velocity model (OVM) the maps the target headway to speed of the vehicles, such that the DRL controller is an OVM-augmented DRL.

8. The system of claim 1, wherein the traffic state includes current headways, current speeds, and current acceleration of the mixed-automata vehicles.

9. The system of claim 8, wherein the mixed-automata vehicles include all uncontrolled vehicles within a predetermined range from flanking controlled vehicles in the platoon.

10. The system of claim 1, wherein the headway-based model relates current headways, stopping headways and go-ahead headways of the mixed-automata vehicles to target speed of the mixed-automata vehicles, wherein the target headways determined by the parameterized function are the go-ahead headways and wherein the processor determines the target speeds of the controlled commands for the mixed-automata vehicles according to the headway-based model with the determined go-ahead headways and predetermined fixed stopping headways.

11. The system of claim 1, wherein the parameterized function is trained using a deep deterministic policy gradient method, an advantage-actor critic method, a proximal policy optimization method, a deep Q-network method, or a Monte Carlo policy gradient method.

12. The system of claim 1, wherein the system is arranged on a remote server in direct or indirect wireless communication with the mixed-automata vehicles.

13. A method for direct and indirect control of mixed-autonomy vehicles, wherein the method uses a processor coupled with stored instructions implementing the method, wherein the instructions, when executed by the processor carry out steps of the method, comprising:
   receiving a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group;
   submitting the traffic state into a parameterized function trained to transform the traffic state into target headways for the mixed-autonomy vehicles to produce the target headways;
   submitting the target headways to a headway-based model configured to map the target headways to target speeds of the mixed-autonomy vehicles to produce the target speeds;
   determining control commands to the controlled vehicle based on one or combination of the target headways and the target speeds; and
   transmitting the control commands to the controlled vehicles in the group of mixed-autonomy vehicles, wherein the parameterized function is a deep reinforcement learning (DRL) controller trained to transform the traffic state of the group of mixed-autonomy vehicles into the target headways than improve actions of the mixed-autonomy vehicles in the group, wherein the actions are defined by the target headways according to the headway-based model, wherein the target headways are determined such that the actions improve a value function of a cost of the movement of the platoon formation, wherein the value function is a negative of a sum of the cost of the movement of the mixed-automata vehicles over a planning horizon of time.

14. A non-transitory computer readable storage medium embodied thereon a program executable by a processor for performing a method, the method comprising:
   receiving a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group;
   submitting the traffic state into a parameterized function trained to transform the traffic state into target headways for the mixed-autonomy vehicles to produce the target headways;
   submitting the target headways to a headway-based model configured to map the target headways to target speeds of the mixed-autonomy vehicles to produce the target speeds;
   determining control commands to the controlled vehicle based on one or combination of the target headways and the target speeds; and
   transmitting the control commands to the controlled vehicles in the group of mixed-autonomy vehicles, wherein the parameterized function is a deep reinforcement learning (DRL) controller trained to transform the traffic state of the group of mixed-autonomy vehicles into the target headways than improve actions of the mixed-autonomy vehicles in the group, wherein the actions are defined by the target headways according to the headway-based model, wherein the DRL controller is a model-based DRL augmented with the headway-based model to solve an on-line optimization to simultaneously learn a behavior of a traffic system having the traffic state and learn to control of the traffic system to form the platoon, such that the behavior of the traffic system is defined by the target headways produced by the DRL controller and the control of the traffic system is defined by accelerations of mixed-automata vehicles determined from the target headways according to the headway-based model.

15. A system for direct and indirect control of mixed-autonomy vehicles, comprising:
   a receiver configured to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group;
   a memory configured to store a parameterized function trained to transform the traffic state into target headways for the mixed-autonomy vehicles; and store a headway-based model configured to map the target headways to target speeds of the mixed-autonomy vehicles;
   a processor configured to submit the traffic state into the parameterized function to produce the target headways; submit the target headways to the headway-based model to produce the target speeds; and determine control commands to the controlled vehicle based on one or combination of the target headways and the target speeds; and
   a transmitter configured to transmit the control commands to the controlled vehicles in the group of mixed-autonomy vehicles,
   wherein the parameterized function is a deep reinforcement learning (DRL) controller trained to transform the traffic state of the group of mixed-autonomy vehicles into the target headways than improve actions of the mixed-autonomy vehicles in the group, wherein the actions are defined by the target headways according to the headway-based model, wherein the headway-based model is an optimal velocity model (OVM) the maps the target headway to speed of the vehicles, such that the DRL controller is an OVM-augmented DRL.

16. A system for direct and indirect control of mixed-autonomy vehicles, comprising:
   a receiver configured to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group;
   a memory configured to store a parameterized function trained to transform the traffic state into target headways for the mixed-autonomy vehicles; and store a headway-based model configured to map the target headways to target speeds of the mixed-autonomy vehicles;
   a processor configured to submit the traffic state into the parameterized function to produce the target headways; submit the target headways to the headway-based model to produce the target speeds; and determine control commands to the controlled vehicle based on one or combination of the target headways and the target speeds; and
   a transmitter configured to transmit the control commands to the controlled vehicles in the group of mixed-autonomy vehicles,
   wherein the headway-based model relates current headways, stopping headways and go-ahead headways of the mixed-automata vehicles to target speed of the mixed-automata vehicles, wherein the target headways determined by the parameterized function are the go-ahead headways and wherein the processor determines the target speeds of the controlled commands for the mixed-automata vehicles according to the headway-based model with the determined go-ahead headways and predetermined fixed stopping headways.

* * * * *